US006222555B1

United States Patent
Christofferson et al.

(10) Patent No.: US 6,222,555 B1
(45) Date of Patent: Apr. 24, 2001

(54) METHOD FOR AUTOMATICALLY SMOOTHING OBJECT LEVEL OF DETAIL TRANSITIONS FOR REGULAR OBJECTS IN A COMPUTER GRAPHICS DISPLAY SYSTEM

(75) Inventors: Carl L. Christofferson, Seattle, WA (US); Frank C. Christofferson, Broomfield, CO (US)

(73) Assignee: Christofferson Enterprises, LLC, Oakton, VA (US)

( * ) Notice: Subject to any disclaimer, the term of this patent is extended or adjusted under 35 U.S.C. 154(b) by 0 days.

(21) Appl. No.: 09/099,587

(22) Filed: Jun. 18, 1998

Related U.S. Application Data
(60) Provisional application No. 60/050,088, filed on Jun. 18, 1997.

(51) Int. Cl.$^7$ ................................................. G06T 17/00
(52) U.S. Cl. .............................. 345/428; 703/1; 345/430
(58) Field of Search ........................... 345/428, 430; 703/1; 364/508

(56) References Cited

U.S. PATENT DOCUMENTS

| | | | |
|---|---|---|---|
| 4,933,889 | * 6/1990 | Meshkat et al. | 364/578 |
| 5,949,425 | * 9/1999 | Willis | 345/428 |
| 5,986,663 | * 11/1999 | Wilde | 345/428 |
| 5,999,187 | * 12/1999 | Dehmlow et al. | 345/420 |

OTHER PUBLICATIONS

Renze et al (0272–17–16/96:IEEEGeneralized Unstructured Decimation).*

Hall et al (0272–17–16/90:IEEE Adaptive Polyganalization of Implicity Defined Surfaces).*

* cited by examiner

*Primary Examiner*—Mark Zimmerman
*Assistant Examiner*—Mano Padmahabnan
(74) *Attorney, Agent, or Firm*—Clyde R. Christofferson

(57) ABSTRACT

A database and execution hierarchy for computer graphics display systems that breaks LOD transitions into two functional steps. The first is the geometry transition, and the second is the detail transition, provided by texture maps. The geometric transition applies conformal fixed vertex decimation methods to create multiple levels of detail with a shared vertex coordinate database. Transitions between LOD's are made seamless by creating the multiple LOD levels with macrogrids of fixed, non-decimated vertices. These are generated using a hierarchical approach that reduces the number of fixed points in the macrogrid at each successive level. Visual anomalies associated with color and texture transitions are reduced by using texture maps to ensure consistent detail transitions for pixels between LOD's. The textures capture the detail information of the highest LOD using orthographic rendering on a grid matching the geometric macrogrid. Database storage size and transmission rate are optimized. Vertex storage is minimized by reuse for cospatial LOD's. Surface normal descriptions can also be eliminated, saving substantial additional space, and reducing the setup calculations for a large portion of the scene since lighting is precalculated and can be disabled for higher LOD's. Texture indices can also be reused for grouped LOD's.

5 Claims, 4 Drawing Sheets

PERSPECTIVE SCENE

PERSPECTIVE SCENE

LEVEL OF DETAIL 1,
ORTHOGRAPHIC VIEW

LEVEL OF DETAIL 1,
PERSPECTIVE VIEW

LEVEL OF DETAIL 2,
ORTHOGRAPHIC VIEW

LEVEL OF DETAIL 2,
PERSPECTIVE VIEW

LEVEL OF DETAIL 3,
ORTHOGRAPHIC VIEW

LEVEL OF DETAIL 3,
PERSPECTIVE VIEW

METHOD FOR AUTOMATICALLY SMOOTHING OBJECT LEVEL OF DETAIL TRANSITIONS FOR REGULAR OBJECTS IN A COMPUTER GRAPHICS DISPLAY SYSTEM

This patent application claims priority from provisional application 60/050,088 of the same title filed on Jun. 18, 1997.

BACKGROUND OF THE INVENTION

1. Field of the Invention

The present invention generally relates to computer graphics rendering systems for the creation and display of arbitrarily complex scenes, and in particular to methods for improving the apparent performance of such systems under the constraints imposed by operation in real-time.

2. Background Description

Computer systems designed to generate images often are comprised of various stages that can be implemented in combinations of hardware and software. Although there are a great variety of implementations, in general all systems are similar in function. At the coarsest level, computer graphics systems consist of two major components: a database to describe the geometric entities which need to be created, and the rendering pipeline, which transforms this database into a displayed image.

The performance limitations of a computer graphics system are most poignant in real-time situations, where scene complexity is limited by the specific amount of time available to generate the image. For example, real-time image generators (another name for computer graphics rendering systems) commonly must complete and display a new frame every thirtieth of a second. How an image generator implements the various intermediate stages and characterizes its inevitable bottlenecks bounds its performance.

The two most common gauges of performance of a graphics system are its ability to generate geometric primitives, such as polygons, and screen space primitives, such as pixels. (For the sake of clarity, the remainder of this document will discuss polygons and pixels, although the methods described herein would apply equally well to many other methods of image generation, such as parametric surfaces with control points, and non-raster displays.)

Polygon and pixel processing are also the source of two of the major bottlenecks in rendering pipelines. Polygon processing usually dominates the front-end of the pipeline, and is often the limiting factor for the transition between database loading and rendering. Pixels are generated within the rendering pipeline, prior to image display.

One of the challenges of designing computer graphics systems is that simply changing the viewing position of a static database can drastically alter the polygonal or pixel requirements. It is therefore important that methods to extend the apparent capability of computer graphics systems behave in a manner which performs consistently. For real-time situations, solutions which vary widely in effectiveness depending on viewing position are of questionable value, since the worst case is always the constraint limiting performance.

Much of the work aimed at optimizing these systems focuses on the fact that computer imagery is usually generated with a perspective view, as is common in stereo viewing in real life. The representation of a polygon and its pixel coverage changes depending on its position and the viewing position in a perspective scene. The farther away from the viewpoint an object is, the smaller its screen representation. The problem this creates is that perspective scenes of a relatively balanced distribution of objects concentrate object density in the distance. This is directly in opposition to the usual desire to have more detail close to the viewer. This problem is demonstrated in FIG. 1, using equal area quadrilaterals. Many methods to improve apparent performance, including the present invention, key on this observation. Note that these methods focus on the front-end of the graphics pipeline Current Solutions and Their Deficiencies
Far plane clipping By far the simplest method of reducing distance-based complexity in a scene is to limit the viewing far plane, or the effective distance viewed. This uses the capability of most computer graphics systems to define a clipping plane perpendicular to the line of sight at some distance. Moving this plane closer to the viewpoint reduces the number of objects seen at a distance, and often increases the geometric precision of objects remaining in view.

However, most applications cannot limit the viewing distance arbitrarily, as this method obviously limits the depth of view. Some degree of this solution is usually used in concert with other methods, particularly to handle worst-case situations dynamically.
Narrow field of view Similar to the far clipping plane are the four (top, left, bottom, right) walls of the viewing volume, or frustum, which represent the edges of the screen extended into the perspective world. Unlike human sight, the field of view, or width and height of the corresponding image, does not have to map precisely to the viewing angle subtended by the viewer's eyes and the physical screen dimensions. One effect of modifying this viewing angle is much like the zoom function of binoculars, where, a narrower field of view (in height or width or both) can reduce overall scene complexity while concentrating on a limited area. When one axis of the field of view is modified without relation to the other, the field of view's aspect ratio is changed.

There are two problems with this solution. One, it breaks the tie between normal human perspective experience and the artificial scene. Forcing a false perspective is disconcerting and may have negative human factors considerations. Secondly, limiting the field of view can severely hamper immersion in a scene. The general goal is to increase the display size and field of view, not reduce it.
Line of sight minimization A series of techniques designed to reduce the processing required for image generation involves rejecting occluded objects in a scene. If you are in a room of a mansion looking at a solid wall, there is no need to process all the rooms beyond that wall. These methods have the added benefit of reducing depth complexity and corresponding pixel loads, and were developed primarily for interior room viewing situations, such as visual building 'walk throughs'.

Although useful, these methods have several serious drawbacks for real-time situations. First and foremost, they mitigate scene complexity only in certain situations, and are subject to complete breakdown for many scenes, which is unacceptable for real-time environments. Secondly, many of the algorithms require occlusion preprocessing, which is both computationally and representationally demanding for large databases. Finally, hybrid solutions require a two-stage rendering process with buffer and object processing feedback, an unrealistic demand on current generations of graphics hardware. By itself, this method is unsuitable for arbitrary scene reduction.

Level of Detail (LOD) transitions

By far the most generally useful method for scene complexity reduction is employing Levels of Detail (LOD's). A database created with multiple LOD's allows the geometric density of the database to vary depending on viewing distance. For instance, a building seen from a distance might be represented by a cube, but when viewed close up it may have much greater geometric detail. (Note: geometric detail is not to be confused with detailed surface textures. They are independent concepts.)

The LOD method allows dynamic optimization of the apparent detail in a scene by concentrating the greatest effort of the image generator on the objects viewed at a close range. In situations where the eyepoint or the objects viewed are moving, LOD's allow different representations on the fly. This introduces one of the chief drawbacks of LOD implementations, transition anomalies. These effects and various partial solutions are described below. The second major drawback of the LOD approach is the need for additional database resources, where each level of detail requires independent object descriptions, increasing the size and complexity of the geometric database.

LOD Transition Anomalies

The most common and simplistic LOD implementation is to have multiple geometric descriptions of the object to be displayed and to simply choose which representation is to be sent to the image generator based on a criteria, usually distance from viewer. This method by itself creates 'popping' as an object switches from one LOD to another, and possibly back again in an oscillating situation. Some systems also use LOD as a dynamic scene overload solution, trading off visual complexity as the performance capacity of the system is reached. This creates a non-deterministic and thus inconsistent criteria for the selected object display. In all cases, LOD transitions create varying levels of undesirable visual anomalies.

There are two classes of problems commonly associated with LOD transitions. One is caused by the rapid change from one representation to another, which is distracting to the viewer. Another is related to terrain objects where an incongruous background color is introduced in situations where there is a gap in geometry between LOD's. This change is even more noticeable to the viewer, as it usually results in high-contrast visual transitions called holes, or cracks. Both these cases are often described as 'popping'.

A simplistic solution to holes is to attempt to match the background color with the terrain object. This severely limits the range of attributes of the terrain, and is thus practically unusable. Another method is to create 'skirt' polygons, which are created as a post process. These can create abrupt nonconformal geometries.

One solution to popping during terrain LOD switching is to extend the transition zone from one representation to another, fading one in as the other fades out. This requires translucency sort/merge capabilities on the target system. Sorted transparency is often either expensive or not available in hardware. Holes or cracks must still be dealt with for this solution not to cause popping. This translucency solution enhances the benefits of the invention, but is not required.

Another solution is dynamic transitions. This method 'morphs' the representation of geometry from one level of detail to the next, creating temporary intermediate geometric representations in real-time. This also eliminates the second popping artifact—cracks—and substitutes the anomaly of objects 'growing' or 'shrinking'. Additionally, it requires dynamic calculations to implement. In the case of a non-regular database, these interpolation calculations are non-trivial. Again, these solutions can be used to enhance the effect of the invention, but are not required.

A final, common solution to abrupt LOD transitions is to obscure the transition zones with distance haze. Haze is a basic and low cost function common to most image generation systems. However, haze use by its nature must be limited, else it create an effect similar to an abrupt far clipping plane.

None of these solutions address a fundamental problem of geometric transitions: the attribute data corresponding to colors and textures applied to geometry at multiple levels of detail has no method for safe interpolation of arbitrary attributes. The eye may forgive gradual geometric changes, but is extremely sensitive to variations in intensity in particular. This is precisely the artifact most disturbing about transitions and one of the chief benefits of the invention.

SUMMARY OF THE INVENTION

It is therefore an object of the present invention to provide interpolation of arbitrary attribute data corresponding to colors and textures for application to geometry at multiple levels of detail.

Another object of the invention is to provide seamless transitions between LODs.

A further object of the invention is to reduce the visual anomalies associated with color and texture transitions between LODs.

Yet another object of the invention is to optimize database resources required for LOD transitions, and to optimize transmission rate for the rendering pipeline.

An additional object of the invention is to be compatible with existing techniques for reducing LOD transition anomalies.

The ultimate goal of computer graphics rendering systems is to allow the creation and display of arbitrarily complex scenes, similar to those seen by the human eye in a variety of real-world environments. Technology and cost considerations in practice impose design constraints on image generation systems demanding compromises in visual complexity and quality. Methods which increase the apparent performance of a computer graphics system are therefore of value. The invention describes one such method.

The invention consists of a database and execution hierarchy that breaks LOD transitions into two functional steps. The first is the geometry transition, and the second is the detail transition, provided by texture maps.

The geometric transition applies conformal fixed vertex decimation methods to create multiple levels of detail with a shared vertex coordinate database. Transitions between LOD's are made seamless by creating the multiple LOD levels with macrogrids of fixed, non-decimated vertices. These are generated using a hierarchical approach that reduces the number of fixed points in the macrogrid at each successive level. (See FIG. 2).

The invention reduces the visual anomalies associated with color and texture transitions by using texture maps to ensure consistent detail transitions for pixels between LOD's. The textures capture the detail information of the highest LOD using orthographic rendering on a grid matching the geometric macrogrid.

The invention also optimizes database storage size and transmission rate. Vertex storage is minimized by reuse for cospatial LOD's. This is beneficial in practice due to the nature of cospatial LOD's, where temporal processing allows simultaneous caching of vertices for access. Due to the prerendered nature of the textures for higher LOD's, surface normal descriptions can also be eliminated, saving substantial additional space, and reducing the setup calculations for a large portion of the scene since lighting is precalculated and can be disabled for higher LOD's. Texture indices can also be reused for grouped LOD's.

The invention is compatible with and benefits from translucency, dynamic transition, and haze methods.

Invention Limitations

In current practice, the invention requires regular grids for efficient run-time execution. Otherwise, multiple texture indexing and masking would be required for boundary polygons. The effects of this limitation can be reduced by using large texture maps, allowing internal LOD's with irregular shapes. This requires support for large texture maps in a system, as well as efficient dynamic texture loading.

The texture maps for higher LOD's are prerendered from an orthographic view. This creates a problem the same as that created by projecting satellite orthophotos to terrain data, as has been common in military simulators for over a decade. Detail is not captured with equal area precision for geometries with excessive variation in the plane perpendicular to the viewing direction, resulting in smearing during reconstruction. This is alleviated somewhat with high resolution textures. A related restriction is that features which are backfacing to the orthographic view are not captured at all. These situations require manual modification of the database to prevent anomalies. In practice, the effects of these problems have been negligible for our applications.

This method requires relatively large amounts of texture storage. This will become increasingly less of a limitation as texture memory sizes increase and dynamic texture paging capabilities become common. In practice the invention has worked quite well in entertainment applications on current image generators.

Full implementation limits dynamic lighting effects, also due to the prerendered LOD's. However, this is mitigated by the fact general lighting (such as sun-angle) can be rapidly pregenerated, possibly during the simulation initialization phase. Secondly, by enabling standard normals for the higher LOD's, truly dynamic lighting effects become possible.

The invention was developed for terrain databases, but is applicable to certain arbitrary object transitions as well. The core ideas of vertex reuse, LOD level edge matching, separate LOD/texture transitions, and LOD textures are generally useful. One modification is that in many situations an orthographically derived multiple LOD texture would not suffice. In these cases, spherical texture mapping or other similar techniques are called for.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows an implementation of the invention for three levels of detail.

FIG. 3 is an abstract representation of the grid structure evident in FIG. 2.

FIG. 3b is an orthographic view showing an alternate grid structure where the level of detail 2 grids are triads rather than quads, but the level of detail 3 grids are the same scale as in FIG. 3a.

DETAILED DESCRIPTION OF A PREFERRED EMBODIMENT OF THE INVENTION

Figure 1:
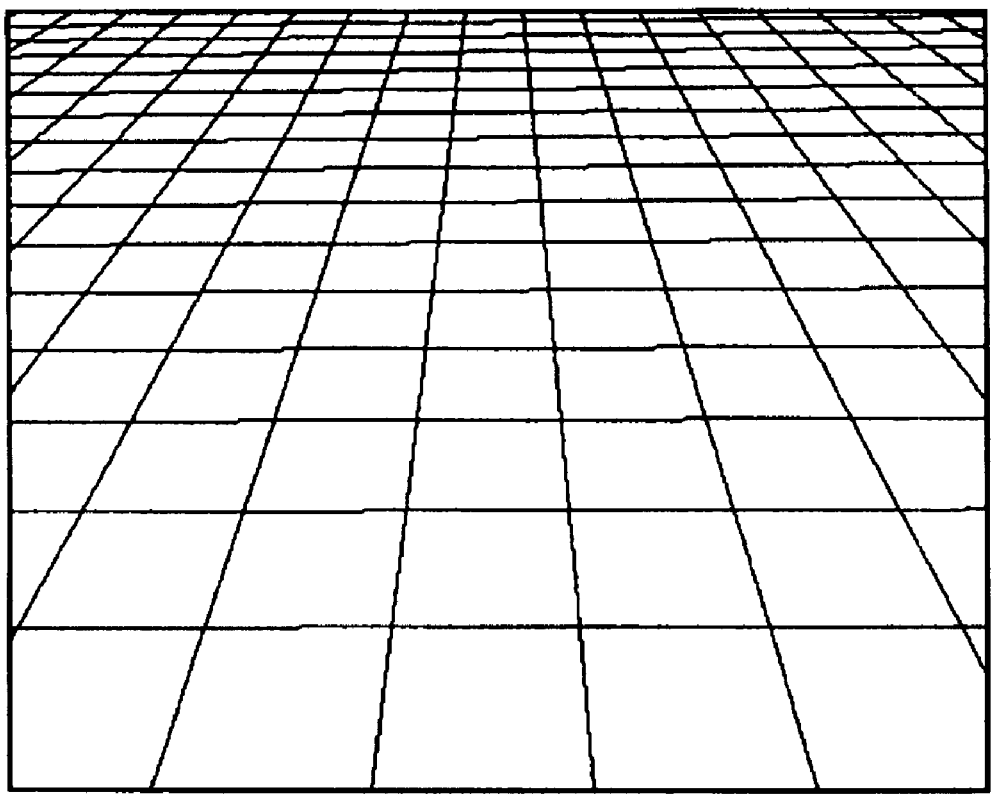
FIG. 1 is a perspective view of a grid of equal area quadrilaterals.

Referring now to the drawings, and more particularly to FIG. 2, there is shown orthographic and perspective views for each level of detail of an implementation of the invention using three levels of detail for a terrain database. The invention is practiced in the following steps.

1) Create a base regular grid of 3D datapoints. This will comprise the total vertex list.

2) Create conformally optimal polygonalization of this vertex list.

3) Create desired partitioning for first level reduction of database into regular grids, called sectors.

4) Perform conformal decimation, fixing points on the perimeter of each sector grid. The second level of detail is often decimated only to the point of eliminating coplanar polygons. This reduces polygons while avoiding geometric anomalies while transitioning the near zone to texture detail.

Figure 2A:
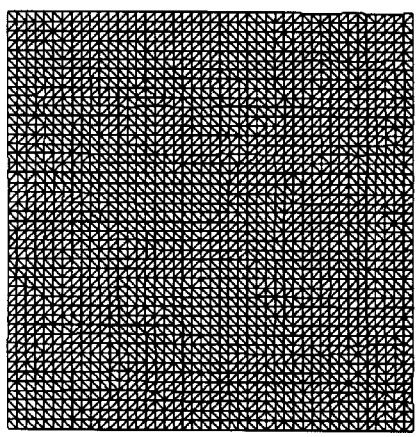
FIG. 2a is an orthographic view of level of detail 1.
Figure 2B:
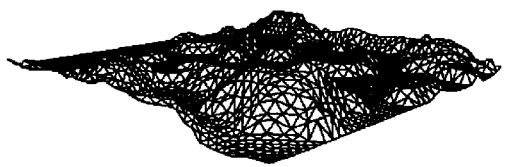
FIG. 2b is a perspective view of level of detail 1.
Figure 2C:
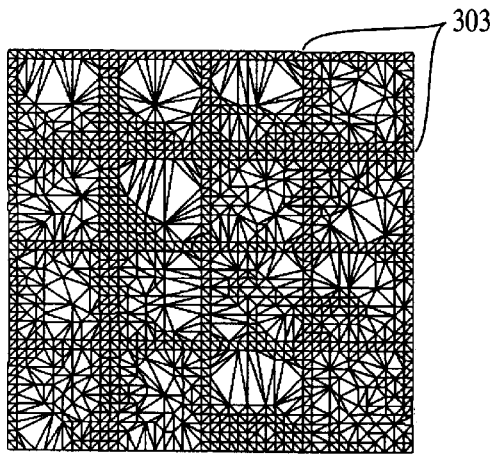
FIG. 2c is an orthographic view of level of detail 2.
Figure 2D:
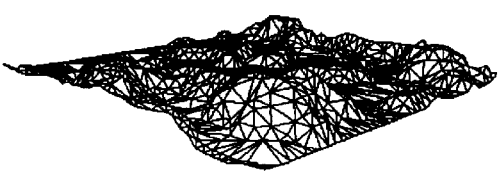
FIG. 2d is a perspective view of level of detail 2.
Figure 2E:
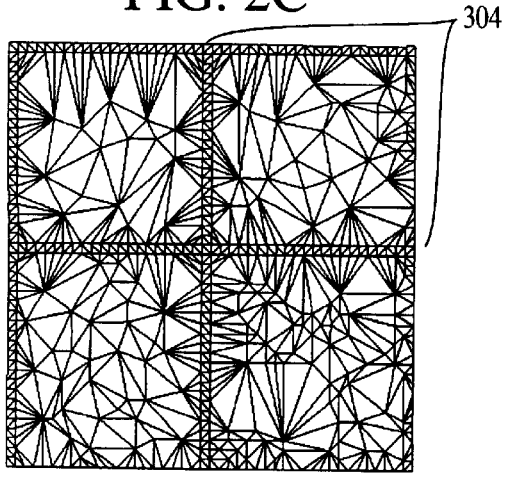
FIG. 2e is an orthographic view of level of detail 3.
Figure 2F:
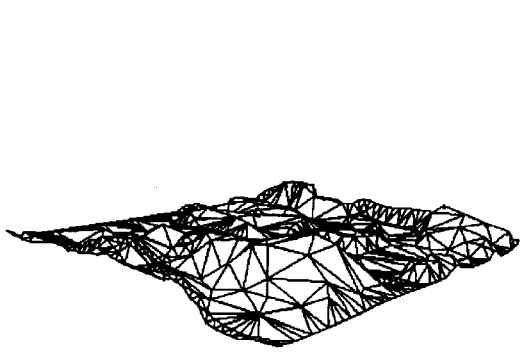
FIG. 2f is a perspective view of level of detail 3.

5) For successive levels of detail reduction, create higher level groupings of fixed grids, such as quads of the previous level (as shown in FIG. 2, where each of the four large sectors in the orthographic view of LOD 3, shown in FIG. 2e, corresponds to a quad of four sectors in the orthographic view of LOD 2, shown in FIG. 2c). Polygonal lists are created using indices into the master vertex list. These indices can be optimized in size by partitioning the database into multiple zones, each restricted to the number of vertices in the desired index size. For example, to use 16 bit vertex indices, the maximum master grid would be 255 vertices on a side. Multiple 'master' grids would be part of the database hierarchy.

A sample database format with the described structure is given in the following C language structure description:

```
/* This is a C language structure description applying the basic
 * elements of the invention to a database. In practice, many
 * additional elements are used, including colors, normal data, etc.
 * There are also many similar structures for conditional
 * data, for example accounting for the fact one LOD may have normal
 * data and another does not. This description concentrates on the
 * inventions's key points:
 *
 * o Geometric LOD's and their hierarchical structure
 * o Vertex list reuse
 * o Texture references and index reuse
 */
struct_file {
/* Global data */
unsigned short terrain_lod_count;        /* Number of LOD's */
float terrain_lod[terrain_lod_count];    /* Default LOD transitions */
/* Texture file data */
unsigned short texfile_count;            /* Number of texture maps in DB */
struct_texfile {
    unsigned char len;                   /* Number of characters in name */
    char name[len];                      /* File name */
    } texfile[texfile _count];           /* Array for each texture map name */
    unsigned short texture_count;        /* Number of shared texture indices */
    float texture[texture_count][2];     /* Arrary of shared texture indices */
    /* Vertex data */
    unsigned short vertex_list_count;    /* Number of master vertex lists *
    struct_vertex_list {
    unsigned short vertex_data_count;    /* Number of vertices */
      struct_vertex_data {
        float vertex[3];                 /* Vertex position vector */
            unsigned short texind;       /* Vertex texture index. */
    } vertex_data[vertex_data_count];
    } vertex_list[vertex_list_count];
    /* Hierarchical information
    *
    * The metaphor here is that of trees (an independent database
    * delineated by the maximum number of vertices allowed), branches
    * (a forking or grouping of basic database types), twigs (groups
    * of spatially related data at different LOD's), and leaves (the
    * actual geometric data with attributes, in this case liimited
    * to the texture index description.)
    */
    unsigned int tree_count;             /* Number of distinct hierarchies */
    unsigned int tree_size[tree_count];  /* Elements in each hierarchy */
    struct_tree {
        unsigned short vertes_list_index;  /* Reference to pertinent vertex_list */
        unsigned short branch_count;       /* Number of branches in hierarchy */
        struct_commands {
            unsigned int type;             /* Code for element type */
            unsigned int size;             /* Bytes in remainder of command. */
            switch (type) {
            case BRANCH:
                unsigned short branch_count;  /* Number of children of this branch */
                struct_commands branch[branch_count];
            case TWIG_SECTOR:
                struct {
                    struct_commands lod_1;    /* LOD 1 hierarchy */
                    struct_commands lod_2;    /* LOD 2 hierarchy */
                    float reference[3];       /* Common 3D reference center */
                } 1[2][2];
                struct_commands lod_3;
                float reference[3];
            case LEAF_TESTRI:
            /* Note that this structure works for both the highest LOD, where
            * individual polygons may have individual textures, and higher LOD's,
            * where sectors share a common texture. For high LOD's, polygons
            * are simply grouped by texture.
            */
                unsigned short poly_count;              /* Number of triangles */
                unsigned short poly[poly_count][3];     /* Index for each vertex */
                unsigned short texfile;                 /* Texture file index */
                unsigned short texture[poly_count][3];  /* Index for each vertex */
            };
        } branch[branch_count];
    } tree[tree_count];
} file;
```

6) Perform conformal decimation of each new level, fixing points on the perimeter of each sector grid.

7) If pregenerated normals are desired, only create them for the first level of detail. Subsequent levels will be rendered with lighting calculations disabled.

8) Orthographically render the highest level of detail, creating texture maps on the boundaries of every-other level of detail. That is, levels 2 and 3 will share texture maps, levels 4 and 5, and so on. This allows the transition of geometry and texture to occur independently within these groupings while enabling maximum texture detail. This can be shown in FIG. 2, where level 1 represents the highest level of detail. Texture maps will be created by rendering level 1 data on the boundaries defined by the sectors in level 3 (not by the sectors in level 2). These texture maps will be applied at both levels 2 and 3. Thus the transition from level 2 to level 3 (i.e. within the level 2/level 3 grouping) will be a geometric transition independent of a texture transition, and the applied texture map will reflect the maximum texture detail of level 1.

9) Upon run-time rendering of the database, transition sectors according to the transition criteria (usually distance). Since edges of sectors at adjacent levels of detail are common, there will be no gaps, while the interiors still allow polygonal optimization. Texture transitions allow maximum detail while enabling precise original detail at the nearest, highest level of detail.

10) Run-time rendering of textured higher LOD's can disable lighting and interpolation calculations for the objects, as the lighting was prerendered in the texture map. These polygons will therefore be processed as non-shaded and textured.

Turning now to FIG. 3, there is shown several variations on the grid structure included in FIG. 2c and FIG. 2e. In each variation, the first level partitioning into a regular grid of sectors, in accordance with step (3), above, is represented with dashed lines, both thin (301) and thick (302). Similarly, in each variation the higher level grouping of partitions, in accordance with step (5), above, is represented with thick lines (302). It is a significant feature of the invention that all the thick lines are also dashed. That is, all the sector boundaries of higher level groupings are a subset of the sector boundaries of the next lower level. This rule applies for all levels of detail, from lowest to highest.

Figure 3A:
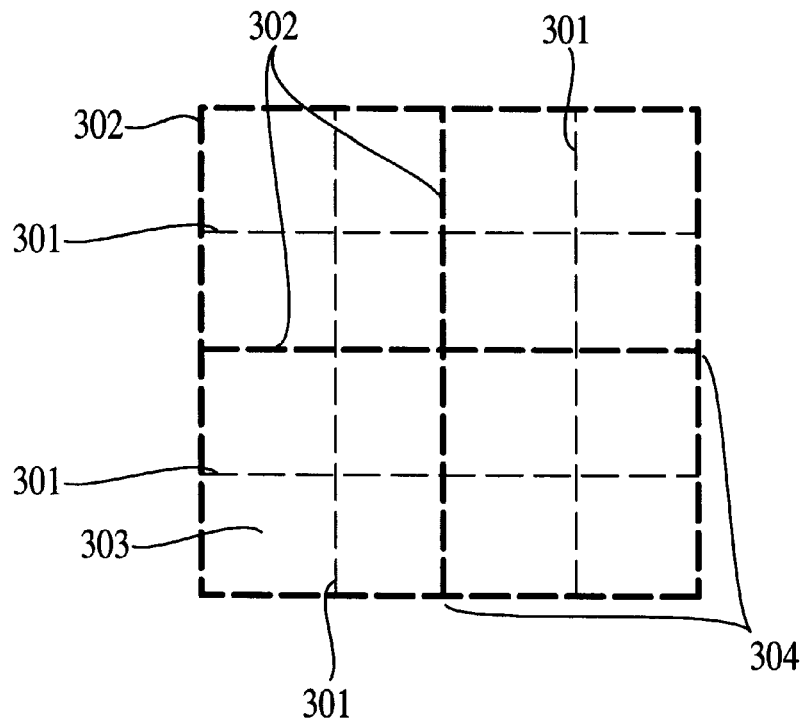
FIG. 3a is an orthographic view showing the grid structure of level of detail 2 (dashed lines) and the grid structure of level of detail 3 (thick lines), taken from FIG. 2.
Figure 3B:
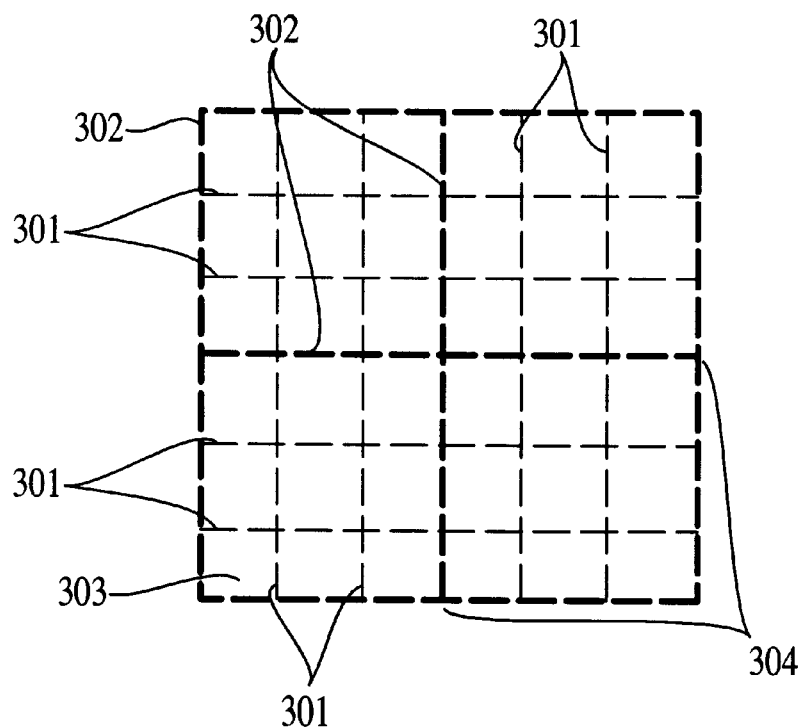
Figure 3C:
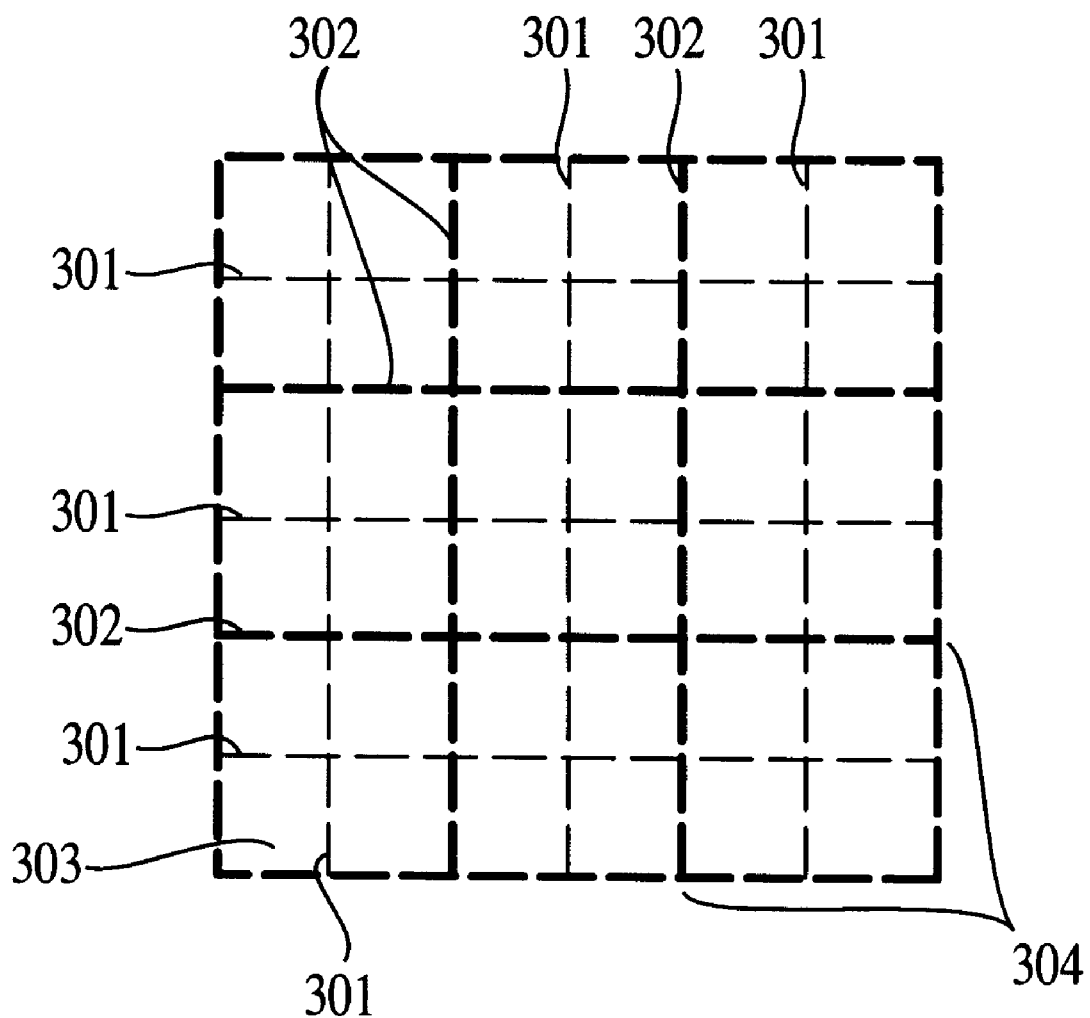
FIG. 3c is an orthographic view showing an alternate grid structure where the level of detail 2 grids are the same scale as in FIG. 3b, but the level of detail 3 grids are comprised of quads rather than triads of the level of detail 2 grids.

In the examples shown in FIG. 3, in each case there are sectors for two levels of detail, a lower level sector (303) and a higher level sector (304). These sectors are elements of a regular grid, i.e. each sector in the grid bears the same relation to the lower level structure from which it is derived. For example, each first level sector (to be used for level of detail 2) may be comprised of a 255 vertex by 255 vertex array (or 512 vertex by 512 vertex array), and each higher level sector (304) in the corresponding next level of detail may be comprised of a two by two (quad) array (as shown in FIGS. 3a and 3c) or a three by three (triad) array (as shown in FIG. 3b).

The pairing of the levels of detail (in the examples shown, levels 2 and 3) is significant because of the creation of texture maps in accordance with step (8), above. It is a significant feature of the invention that the texture maps are created for the higher level sectors (304). It is a further significant feature of the invention that the texture maps for these sectors are created from an orthographic view (i.e. looking down upon the sector), and that they are created from a level of detail (here shown as level 1) of finer resolution than either level of detail associated with the paired levels of detail (here shown as levels 2 and 3). Because the texture map uses the color from the finer resolution level of detail, the color boundaries will be preserved in the texture map. This texture map is applied to the first of the paired levels of detail (in the example given, level 2) and also to the second of the paired levels of detail. Consequently, particularly at the transition to the second of the paired levels of detail—where there is no transition of the texture map, which is the same for both levels in the pair—changes toward a more coarse geometry are somewhat muted (i.e. "smoothed") because some semblance of the finer geometry is preserved through the apparent visual boundaries included in the texture map.

In similar fashion, the geometric transition produced by the initial conformal decimation done in step (4), above, will often be moderate (i.e. done only to the point of eliminating coplanar polygons) and the combination of geometric and texture transitions at the transition to the first of the paired levels of detail will therefore be "smoothed." It is a significant feature of the invention that the transitions of geometry and texture are interlaced as described above, so that in the transition to a particular level of detail the human eye will be able to find continuity (and therefore a sense of "smoothness") in one or the other elements (geometry and texture) of the transition.

Matching at the edges of sectors is accomplished by fixing the vertex points on the perimeter of each sector, that is, those vertex points on the partitions 301 and also 302 (for the decimation generating the first of the paired levels of detail) and just partitions 302 (for the decimation generating the second of the paired levels of detail). Ordinarily, these vertex points will be all those which are along the respective partitions 301 and/or 302, at the same resolution (by default, the highest degree of resolution of the database, associated with level of detail 1) used for rendering texture maps for the sectors defined by partitions 302.

Although not shown, the same principles apply to higher levels of detail (e.g. pairings of levels of detail 4/5 and 6/7). Note that as resources available for polygons and textures increase, the technique of the invention can be applied more flexibly to optimize the smoothing of level of detail transitions.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for automatically smoothing object level of detail transitions for regular objects in a computer graphics display system, comprising the steps of:

applying conformal fixed vertex decimation methods to create multiple levels of detail using a shared vertex coordinate database, each said object being partitioned into a regular grid of sectors, said sectors being combined to form larger sectors at a next level of detail, wherein successive levels of detail after the first are paired; and creating texture maps for said paired levels, to provide detail transition, said texture maps being generated from an orthographic view of said regular object for the larger of the sectors of the levels so paired.

2. A method for automatically smoothing object level of detail transitions for a regular object in a computer graphics display system, said display system representing said regular object as a grid of three dimensional datapoints, comprising the steps of:

creating a conformally optimal polygonalization of said datapoints, and applying textures thereto;

partitioning said datapoints into base sectors, said base sectors being viewed as a regular grid from a view which is orthographic with respect to said regular object;

partitioning said regular grid into one or more successive pairs of finer grained sectors and coarser grained sectors, said finer grained sectors being bounded by lower level partition lines and said coarser grained sectors being bounded by higher level partition lines, said higher level partition lines being a subset of said lower level partition lines, wherein for the first of said successive pairs said finer grained sector is said base sector, and wherein said lower level partition lines of any pair beyond said first pair are a subset of the higher level partition lines of the immediately preceding pair;

creating, for each said pair of sectors, texture maps for said coarser grained sectors, said texture maps being generated from said orthographic view of said regular object's optimal polygonalization and applied textures;

creating a level of detail pair, corresponding to each said pair of finer and coarser grained sectors, comprising a lower level of detail and a higher level of detail, respectively, said lower level of detail being created by performing conformal decimation of said datapoints after fixing said datapoints which are along said lower level partition lines, and said higher level of detail being created by performing conformal decimation of said datapoints after fixing said datapoints which are along said higher level partition lines;

applying said texture maps to both levels of said detail pair; and transitioning to coarser levels of detail at runtime in accordance with a transition criteria.

3. An apparatus for automatically smoothing object level of detail transitions for a regular object in a computer graphics display system, said display system representing said regular object as a grid of three dimensional datapoints, comprising:

means for creating a conformally optimal polygonalization of said datapoints, and applying textures thereto;

means for partitioning said datapoints into base sectors, said base sectors being viewed as a regular grid from a view which is orthographic with respect to said regular object;

means for partitioning said regular grid into one or more successive pairs of finer grained sectors and coarser grained sectors, said finer grained sectors being bounded by lower level partition lines and said coarser grained sectors being bounded by higher level partition lines, said higher level partition lines being a subset of said lower level partition lines, wherein for the first of said successive pairs said finer grained sector is said base sector, and wherein said lower level partition lines of any pair beyond said first pair are a subset of the higher level partition lines of the immediately preceding pair;

means for creating, for each said pair of sectors, texture maps for said coarser grained sectors, said texture maps being generated from said orthographic view of said regular object's optimal polygonalization and applied textures;

means for creating a level of detail pair, corresponding to each said pair of finer and coarser grained sectors, comprising a lower level of detail and a higher level of detail, respectively, said lower level of detail being created by performing conformal decimation of said datapoints after fixing said datapoints which are along said lower level partition lines, and said higher level of detail being created by performing conformal decimation of said datapoints after fixing said datapoints which are along said higher level partition lines;

means for applying said texture maps to both levels of said detail pair; and means for transitioning to coarser levels of detail at runtime in accordance with a transition criteria.

4. The method of claim 1, wherein said conformal decimation is applied to a first level of each said pair only to the point of eliminating coplanar polygons.

5. The method of claim 1, wherein lighting is pre-rendered in said texture map at said first level of detail and wherein lighting and interpolation calculations are disabled at runtime for said levels of detail beyond the first.

* * * * *